UNITED STATES PATENT OFFICE.

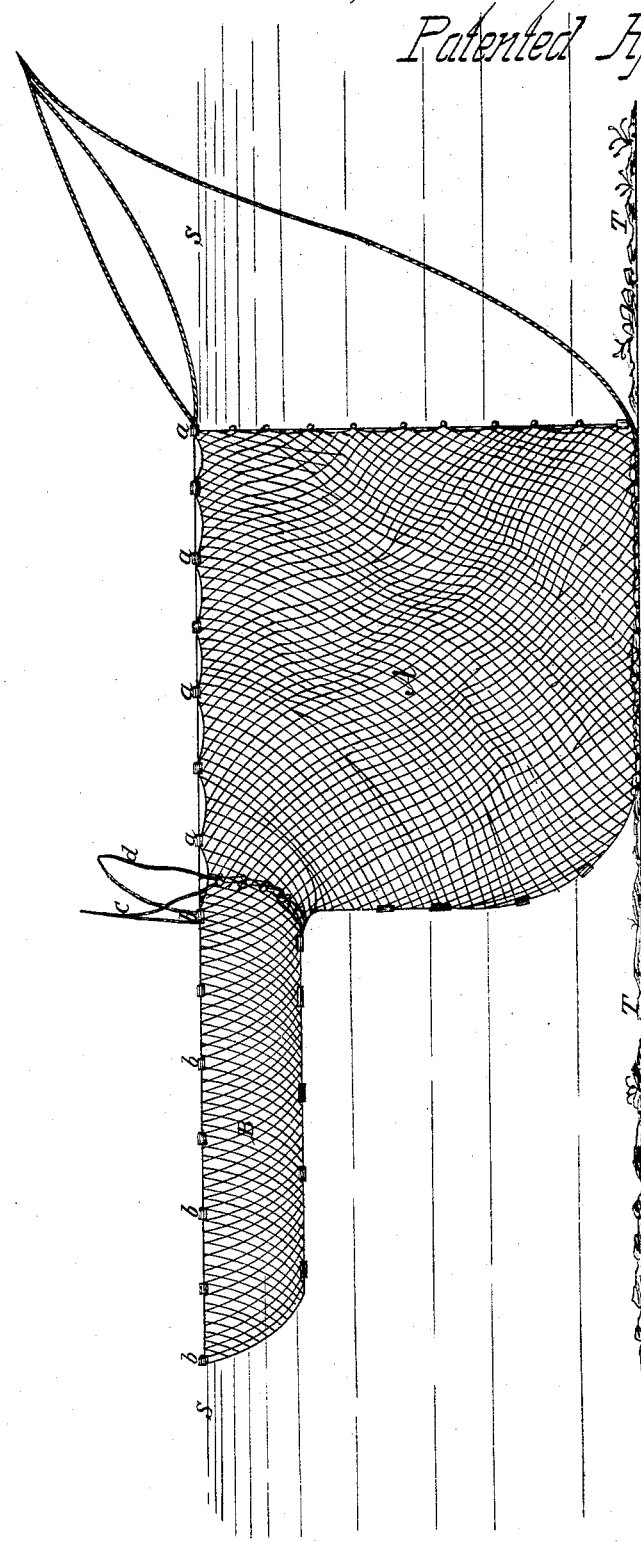

THOS. HALL, OF GLOUCESTER, MASSACHUSETTS, ASSIGNOR TO THOS. HALL & CO., OF SAME PLACE.

FISHING-NET.

Specification forming part of Letters Patent No. 20,125, dated April 27, 1858.

*To all whom it may concern:*

Be it known that I, THOMAS HALL, of Gloucester, in the county of Essex and State of Massachusetts, have invented an Improvement in Nets or Seines for Taking Fish; and I do hereby declare that the same is fully described and represented in the following specification and the accompanying drawing, which denotes a side elevation of a seine having my invention applied to it.

The nature of my invention consists in the application to a common seine of a long bag or net to float on the surface of the water and extend beneath such surface, and open at its mouth into the body of the seine during the draft of the seine, so as to take a shoal of fish. On elevating the bottom of the seine, the fishes will be caused to pass into the bag net, so as to be entrapped therein.

In the drawing, A may be supposed to represent an ordinary seine furnished with corks or other floats *a a a*, and all the other appliances usually belonging to a seine for taking fish. B denotes the bag-net, made in the form of a bag, and with its mouth connected to the cork-line or upper edge of the seine. This bag should be furnished with one or more rows of corks or floats, *b b b,* which should be affixed to one side of it, and so that when the bag is thrown into the water it will be held up horizontally therein. If necessary, small weights or leads may be applied to the opposite side or other proper parts of the bag, in order not only to sink it below the surface of the water while its upper side floats on or about at the surface of the water, but to present its mouth open to the interior of the seine.

In the drawing, S S denotes the surface of the sea or water, while T T exhibits its bottom.

In applying the mouth of the bag or net to the head-rope or upper edge of the seine the connection should be of such nature as to enable one to be readily disengaged from the other, when such may be desirable, and around the lower edge of the mouth of the bag there may be a few small weights, such as will suffice to sink that part of the head-rope or margin of the seine which may be attached to the bag. On removal of the bag from the seine the part directly underneath the bag will rise and float on the surface of the water.

A closing-line, *c,* may be so applied to the mouth of the net or bag as to enable it to be drawn together, so as to confine the fish within the net before it may be detached from the seine. Furthermore, a supporting or lifting line or trail, *d,* may be applied to the mouth of the bag, in order to enable the net to be lifted out of the water.

When the seine is set in the ordinary way and made to encompass a shoal of fish, if we attach the bag-net to it and draw the ends of the seine together the fishes will be made to rush into the mouth of the bag. After a sufficient number may have passed into the bag-net its mouth may be closed and the net be separated from the seine, which may remain in place, either with or without fish in it, those in the bag being removed from the water by lifting the bag out of it.

The bag-net thus connected with the head or cork rope of the siene, and working outside of the seine, presents great advantages to fishermen. The necessity of something of this kind has long been felt, for it often happens that after fish have been taken in a seine they cannot be secured in consequence of the net getting caught on the bottom. Many fish are often lost during the process of raising a seine.

With my improvement the seine may remain in place in the water, and need not be raised out of it in order to secure the fish or land them or take them on board of a vessel. Thus, when a haul is great, portions of it may be taken out of the seine by means of the net-bag, as circumstances may require. Thus, by use of my invention, much time and labor may be saved to the fisherman, as by means of the bag, while the fish are being taken away from the seine it may be set for taking more fish.

The great advantage of my invention must be readily discovered and admitted by those engaged in the business of catching fish.

What I claim in the art of taking fish by means of a seine is—

The employment of a bag, B, in combination with the seine A, substantially in manner as specified.

In testimony whereof I have hereunto set my signature.

THOMAS HALL.

Witnesses:
R. H. EDDY,
F. P. HALE, Jr.